United States Patent [19]

Whitehouse et al.

[11] 3,786,278

[45] Jan. 15, 1974

[54] ELECTRONIC SWITCHING APPARATUS

[75] Inventors: Joseph Colin Whitehouse, Blaby; Colin Arthur Wild, Leicester, both of England

[73] Assignee: The Rank Organisation Limited, London, England

[22] Filed: Jan. 31, 1972

[21] Appl. No.: 222,178

[30] Foreign Application Priority Data

Feb. 11, 1971 Great Britain....................4437/71

[52] U.S. Cl............................... 307/252 F, 307/242

[51] Int. Cl........................................... H03k 17/72

[58] Field of Search................ 307/252 F, 221, 225, 307/223, 242

[56] References Cited

UNITED STATES PATENTS

| | | | |
|---|---|---|---|
| 3,629,614 | 12/1971 | Matthews, Jr. | 307/223 X |
| 3,660,683 | 5/1972 | Wangard | 307/252 K |
| 3,217,185 | 11/1965 | Jansons | 307/223 B |
| 3,621,287 | 11/1971 | Peterson | 307/223 X |

*Primary Examiner*—John Zazworsky
*Attorney*—Joseph F. Brisebois et al.

[57] ABSTRACT

A switching circuit for enabling a selected one of a number of channels. The circuit includes a number of devices, one for each channel, each having a voltage/-current characteristic with a negative-impedance region separating two stable states. The devices are fed in parallel from a source of constant current or constant voltage of a magnitude such that only one may assume one of the stable states. The devices may be for example programmable unijunction transistors or tunnel diodes.

5 Claims, 5 Drawing Figures

ELECTRONIC SWITCHING APPARATUS

This invention relates to electronic switching apparatus.

An object of the invention is to provide a switching apparatus for selecting one or more channels from a number of similar channels and which is small, efficient, versatile and reliable and has a low power dissipation.

According to one aspect of the present invention there is provided an electronic switching apparatus including a plurality of electronic devices for switching selected ones of a corresponding plurality of channels, each of said devices being connected in series with a load in such a way that it can have only two stable states, the devices being arranged for connection to a constant-voltage or constant-current so that only a predetermined number of the devices can exist in one stable state, means associated with each device for altering its condition to temporarily make only said one stable state available whereby another of the devices is driven to its other stable state, and a monitor associated with each device arranged to monitor which of its stable states it occupies.

Preferably the devices have an output characteristic which includes a negative impedance region.

The invention also provides an electronic switching apparatus including a plurality of programmable unijunction transistors (PUTs) for switching selected ones of a plurality of channels, a load in series with each PUT to define high and low stable states of voltage and current of the PUT, the series combinations of PUTs and loads being connected together in parallel for connection to a constant current source whose current is sufficient to maintain only a predetermined number of PUTs in the high state, means for applying a controlled voltage across the cathode and gate of each PUT, and means for monitoring each PUT to determine which of its stable states it occupies at any given time.

Preferably, the means for applying a controlled voltage comprises a first Zener diode arranged to normally determine the cathode-gate voltage of each PUT, and a second Zener diode of lower breakdown voltage arranged to be selectively shunted across the first Zener diode.

Preferably also, the first and second Zener diodes are arranged to control a transistor regulating the cathode-gate voltage of the relevant PUT.

The second Zener diode may be shunted across the first by a push-button or by a switching transistor.

An embodiment of the invention will now be described by way of example, with reference to the accompanying drawings, in which:

FIG. 1*a* illustrates a circuit incorporating a programmable unijunction transistor (PUT);

FIG. 1*b* is a graph showing the characteristics of the circuit of FIG. 1*a;*

Figure 1A:
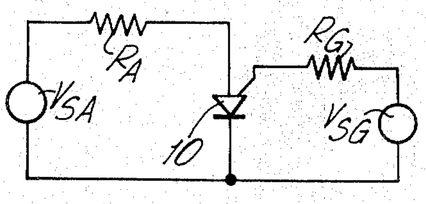
Figure 1B:
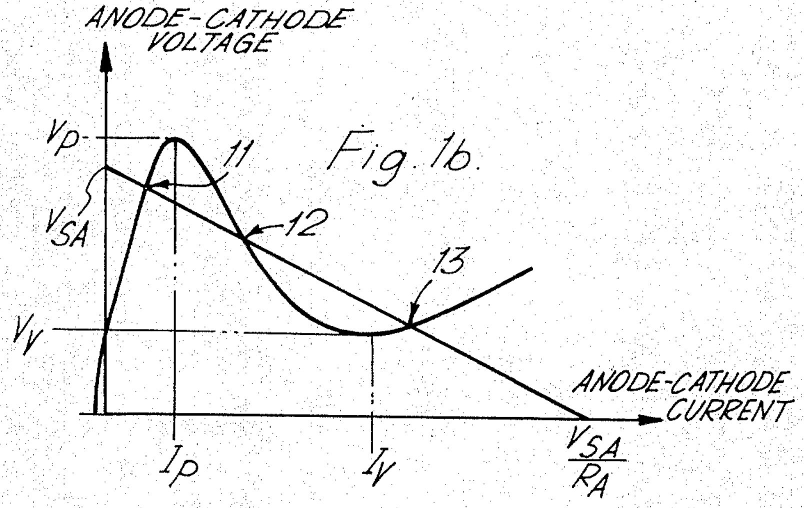

Referring now to FIG. 1, as is known when a voltage $V_{SG}$ is applied in series with a resistance $R_G$ between the gate and cathode of a programmable unijunction transistor (PUT) 10 then the voltage/current characteristic of the PUT 10 is as shown in FIG. 1*b;* this characteristic has a peak voltage Vp and a valley voltage Vv separated by a negative impedance region and the value of the peak voltage Vp is governed by the cathode-gate voltage $V_{SG}$. FIG. 1*b* also shows the load line for a resistance $R_A$ in series with the anode-cathode voltage source $V_{SA}$, and from this it is seen that three possible states exist for the conditions shown in FIG. 1*a*, namely those labelled 11, 12 and 13. The state 12 however is unstable owing to its being situated on the negative impedance region, and in practice the PUT 10 may assume either of the states 11 and 13 which are hereinafter referred to as the "low" and "high" states respectively.

Turning now to the present invention as embodied in FIGS. 2 to 4, the principle of operation may be described with reference to FIG. 2. A number of PUTs designated $PUT_1$, $PUT_2$ . . . . $PUT_n$ are connected in parallel across a constant current source (not shown). Associated with each PUT is a series load resistor $RA_1$, $RA_2$, . . . . $RA_n$ and a voltage source such as $V_{SG1}$ arranged in series with a current-limiting resistor such as $R_{G1}$ between its cathode and gate. The current $I_C$ delivered by the source is such that only a predetermined number (in this embodiment one) of the PUTs can be in the high state at any given time. Assume that $PUT_1$ is in the high state and that all the sources $V_{SG1}$ . . . . $V_{SGn}$ are delivering the same voltage. If then the source, say, $V_{SG2}$ is acted upon to reduce its voltage, the characteristic of the $PUT_2$ is altered in the manner that its peak voltage is reduced; the reduction in the voltage of the source $V_{SG2}$ is made sufficient to bring the peak voltage of $PUT_2$ below the load line thus forcing $PUT_2$ to assume the high state. This in turn draws an increased current through $PUT_2$ and reduces the current available to $PUT_1$ which therefore moves to the low state. At this point the voltage of the source $V_{SG2}$ may be returned to its original value, equal to that of the other sources. By monitoring the anode-cathode voltages of the PUTs a multi-channel two level output is obtained and (in this embodiment, with only one high level) the circuit functions as an EXCLUSIVE-OR device. The outputs may be used to drive any suitable form of two level switch, for example reed relays may be driven via amplifiers.

The PUTs can be easily matched by suitable selection of of $V_{SG}$ and $R_G$.

Figure 2:
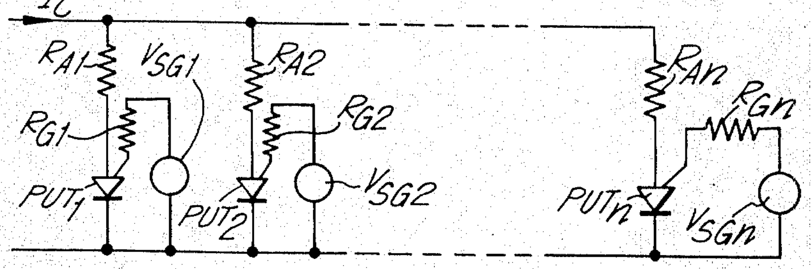
FIG. 2 illustrates the basic form of an embodiment of the invention.
Figures 3, 4:
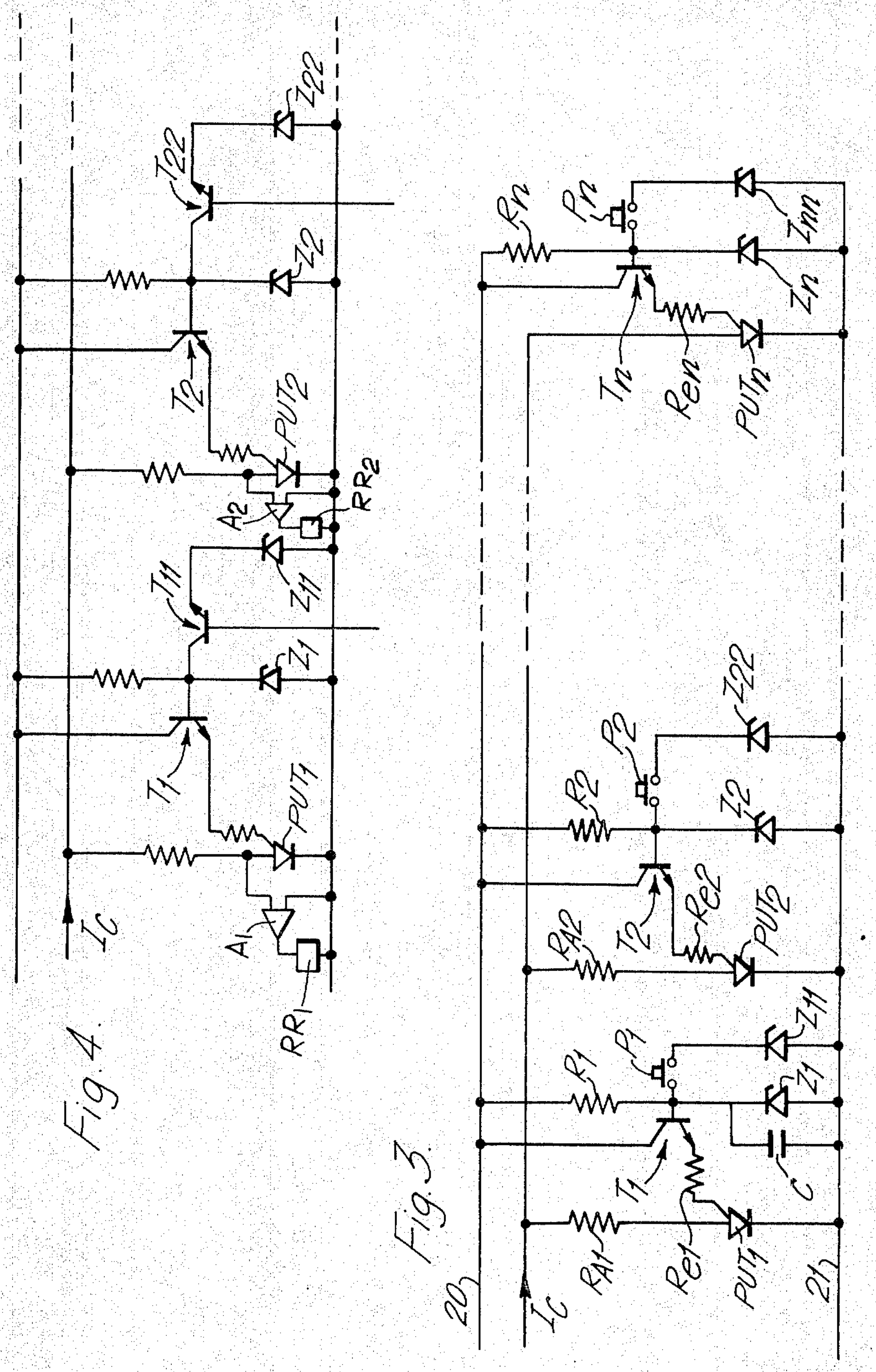
FIG. 3 is a more detailed illustration corresponding to FIG. 2.
FIG. 4 shows a modification of the circuit of FIG. 3.

FIG. 3 illustrates a practical embodiment of the basic circuit of FIG. 2. Each voltage source comprises a series regulating transistor such as $T_2$ whose base bias is normally fixed by a resistor R2 and a Zener diode $Z_2$ connected in series across power supply lines 20, 21 which are fed by a power supply separate from the constant current source for the PUTs. To select, for example, the channel of $PUT_2$ a pushbutton $P_2$ is depressed to connect a further Zener diode $Z_{22}$ across the diode $Z_2$. The reverse breakdown voltage of the further diode $Z_{22}$ is less than that of the diode $Z_2$, and thus the voltage at the gate of $PUT_2$ determined by $T_2$ is reduced and the channel controlled by $PUT_2$ is selected as described above. Each channel is identical, except that of $PUT_1$ has a capacitor C connected across the diode $Z_1$. On switching on the power supply and constant current source, the cathode-gate voltage of $PUT_1$ is held below that of the other PUTs until the capacitor $C_1$ is charged, thus ensuring that $PUT_1$ is selected initially.

As shown in FIG. 4, the push buttons $P_1$ etc. may be replaced by series switching transistors, such as $T_{11}$, whose bases receive control pulses from a remote source, and a monitor may be connected across the anode and cathode of each PUT. As described above, these monitors may consist essentially of two-level reed relays $RR_1$ and $RR_2$ driven through suitable amplifiers $A_1$ and $A_2$.

The invention comprehends the use of devices other than programmable unijunction transistors; any device having two distinct stable states may be used. It is preferred to use devices having a negative impedance region in their output characteristics, and other possible devices of this type are active amplifiers with positive feedback, and tunnel diodes.

With tunnel diodes, for example, the output characteristic is similar to that shown in FIG. 1*b*, but with the ordinate as current and the abscissa as voltage. In this case, the tunnel diodes are connected in series across a constant-voltage source. A particular tunnel diode may be selected by connecting a shunt across it to reduce the applied current. Output may be obtained by monitoring the voltage drop across each tunnel diode, for example by means of a Schmitt trigger circuit.

As the characteristics of semiconductor devices vary with temperature, temperature compensation may be provided by using a voltage or current source of a suitable temperature coefficient. Alternatively, in the embodiment of FIG. 3, it is possible to provide this by suitable choice of the temperature coefficient of the resistors $R_G$.

We claim:

1. An electronic switching apparatus comprising:

a plurality of programmable unijunction transistors (PUTs) connected to switch selected ones of a plurality of channels, a load in series with each PUT which defines high and low stable states of voltage and current of that PUT, the series combinations of PUTs and loads being connected together in parallel, means supplying to said series combinations a constant current sufficient to simultaneously maintain only one of said PUTs in the high state, means connected to apply a controlled voltage across the cathode and gate of each PUT, and means connected to monitor each PUT to determine which of its stable states it occupies at any given time.

2. Apparatus as claimed in claim 1, in which the means for applying a controlled voltage comprises a first Zener diode arranged to normally determine the cathode-gate voltage of each PUT, and a second Zener diode of lower breakdown voltage arranged to be selectively shunted across the first Zener diode.

3. Apparatus as claimed in claim 2, in which the first and second Zener diodes are arranged to control a transistor regulating the cathode-gate voltage of the relevant PUT.

4. Apparatus as claimed in claim 2, including a pushbutton for selectively shunting the second Zener diode across the first.

5. Apparatus as claimed in claim 2, including a switching transistor for selectively shunting the second Zener diode across the first.

* * * * *